US012398872B2

(12) United States Patent
Guedez et al.

(10) Patent No.: US 12,398,872 B2
(45) Date of Patent: Aug. 26, 2025

(54) ELECTRIC LIGHTING SYSTEMS WITH REMOVABLY COUPLABLE POWER DEVICES

(71) Applicant: Voltra Lighting Ltd., Central (HK)

(72) Inventors: Baptiste Robin Guedez, Lantau Island (HK); Timothy James Alexander Ross, Bristol (GB)

(73) Assignee: Voltra Lighting Ltd., Central (HK)

(*) Notice: Subject to any disclaimer, the term of this patent is extended or adjusted under 35 U.S.C. 154(b) by 0 days.

(21) Appl. No.: 18/615,382

(22) Filed: Mar. 25, 2024

(65) Prior Publication Data

US 2024/0230076 A1 Jul. 11, 2024

Related U.S. Application Data

(63) Continuation of application No. 17/654,977, filed on Mar. 15, 2022, now Pat. No. 11,959,622, which is a (Continued)

(51) Int. Cl.
*F21V 23/06* (2006.01)
*F21L 4/08* (2006.01)
(Continued)

(52) U.S. Cl.
CPC ................ *F21V 23/06* (2013.01); *F21L 4/08* (2013.01); *F21V 17/105* (2013.01); *H05B 45/10* (2020.01);
(Continued)

(58) Field of Classification Search
CPC ........ F21V 23/06; F21V 17/105; F21V 21/06; F21L 4/08; F21Y 2105/10; F21Y 2115/10; F21S 9/02; F21S 6/00; H05B 45/10
See application file for complete search history.

(56) References Cited

U.S. PATENT DOCUMENTS 11,098,888 B1 * 8/2021 Walker .................. A47G 19/02
2011/0157877 A1 * 6/2011 Kim .................. F21V 23/0414 362/183

(Continued)

FOREIGN PATENT DOCUMENTS

WO WO-2019169051 A1 * 9/2019 ........... F21S 10/043

*Primary Examiner* — Zheng Song
(74) *Attorney, Agent, or Firm* — GREENBERG TRAURIG LLP (ATL); Trenton A. Ward; Christopher F. Huebner.

(57) ABSTRACT

An example electric lighting system includes a lighting device that includes a housing including a lighting element and a power device holding portion. The power device holding portion includes a cavity. The cavity includes a first and a second electrical contact disposed within the cavity. The power device includes a third and a fourth electrical contact. The power device includes a coupling component. The coupling component is removably couplable to the power device holding portion such that an electrical communication is established when the power device is inserted into the cavity at any rotational position relative to the lighting device about a shared central axis. The power device is operable to power the lighting device through the electrical communication. The electrical communication is established between the first electrical contact and the third electrical contact and between the second electrical contact and the fourth electrical contact.

10 Claims, 9 Drawing Sheets

Related U.S. Application Data continuation of application No. 17/125,450, filed on Dec. 17, 2020, now Pat. No. 11,306,910.

(51) Int. Cl.
*F21V 17/10* (2006.01)
*H05B 45/10* (2020.01)
*F21Y 105/10* (2016.01)
*F21Y 115/10* (2016.01)

(52) U.S. Cl.
CPC ....... *F21Y 2105/10* (2016.08); *F21Y 2115/10* (2016.08)

(56) References Cited

U.S. PATENT DOCUMENTS

2013/0043781 A1* 2/2013 Wang ...................... F21K 9/232
313/46
2013/0148338 A1* 6/2013 Chen ....................... F21V 21/28
362/183
2014/0104812 A1* 4/2014 Patton ....................... F21K 9/23
362/362
2015/0285448 A1* 10/2015 Andersen .................. F21L 2/00
362/205
2021/0396367 A1* 12/2021 Guedez ................... F21S 10/04

* cited by examiner

ELECTRIC LIGHTING SYSTEMS WITH REMOVABLY COUPLABLE POWER DEVICES

This application is a continuation of U.S. Non-Provisional application Ser. No. 17/654,977, filed Mar. 15, 2022, which is a continuation of U.S. Non-Provisional application Ser. No. 17/125,450, filed Dec. 17, 2020, the contents of which are hereby incorporated by reference in the entirety fully set forth below.

BACKGROUND

Field

The present disclosure relates to electric lighting systems that have lighting elements such as LEDs and removably couplable power devices.

Description of Related Art

Current electrical lights require plugging-in, insertion of a battery, connecting wires, or unscrewing components. Connecting wires to a battery or unscrewing components to insert a battery is a time-consuming and unpleasant experience for a user. Lights that need plugging-in also lack the aesthetic and freedom of movement and requires unsightly wiring. These problems are exacerbated when there are numerous lights to maintain. For example, a hotel or a restaurant may require one or more lights for numerous rooms or dining tables. Also, plug-in options would require electrical connections for each table. If a restaurant includes a cordless light at every table, it may take employees significant time to individually plug in each light for charging. If a restaurant includes a light with a cord, the cord may diminish the aesthetic of a cord-free table. Additionally, users that may want to change the appearance of a light may need to purchase an entirely new light, including its power device, instead of just the light itself. Finally, users may want to charge a power device for a light while the light is in use without plugging in the light during use.

SUMMARY

Disclosed herein are electric lighting systems that overcome the limitations of earlier systems. In some embodiments, electric lighting systems allow for easy recharging and replacement, saving time for users. These electric lighting systems may save additional time for a user such as an employee of a hotel or restaurant that set a charged light in every room or at every table each night. Some example electric lighting system embodiments allow for quick and easy insertion and removal of a power device into a lighting element. Some example electric lighting systems have removably couplable power devices such that the power device can be charged while another power device is in use with a lighting element. Such functionality allows a user to, for example, provide a light for a guest at a table in a restaurant, while charging another power device. The removably couplable functionality overcomes disadvantages of other systems which would require a user to purchase two lights for continuous use, since the power device cannot be removed to be charged.

Some example electric lighting systems may include any one or more of the following elements. Some example electric lighting systems include a lighting device. The lighting device may include a housing that includes a lighting element and a power device holding portion. The power device holding portion may include a cavity. The cavity may include a first electrical contact disposed within the cavity and a second electrical contact disposed within the cavity. The power device may include a third electrical contact and a fourth electrical contact. The power device may include a coupling component. The coupling component may be removably couplable to the power device holding portion such that an electrical communication is established when the power device is inserted into the cavity at any rotational position relative to the lighting device about a shared central axis. The power device may be operable to power the lighting device through the electrical communication. The electrical communication may be established between the first electrical contact and the third electrical contact and between the second electrical contact and the fourth electrical contact.

In some example electric lighting systems, the third electrical contact may be operable to engage the first electrical contact at any rotational position of the power device relative to the lighting device about the shared central axis. The fourth electrical contact may be operable to engage the second electrical contact at any rotational position of the power device relative to the lighting device about the shared central axis.

In some example electric lighting systems, the first electrical contact may encircle the second electrical contact and the third electrical contact may encircle the fourth electrical contact.

In some example electric lighting systems, the power device holding portion may include a lighting device magnet disposed within the cavity. The coupling component may include a power device magnet positioned to engage with the lighting device magnet.

In some example electric lighting systems, the lighting device magnet and the power device magnet may be configured such that the power device is self-orienting with respect to the lighting device.

In some example electric lighting systems, the power device holding portion may include a plurality of lighting device magnets within the cavity. The power device may include a plurality of power device magnets positioned to engage with the plurality of lighting device magnets.

In some example electric lighting systems, the power device may provide a base for the lighting device when the coupling component is removably coupled to the lighting device such that the lighting device is operable to stand upright on the power device.

In some example electric lighting systems, the electric lighting system may include a charger removably couplable to a bottom portion of the power device. The charger may provide a base for the power device when the charger is removably coupled to the power device such that the power device is operable to stand upright on the charger.

In some example electric lighting systems, the power device may include a controller operable to adjust the brightness of the lighting element.

In some example electric lighting systems, the power device may include a controller. The lighting element may include an array of light emitting diodes (LEDs). The controller may be operable to independently adjust the brightness of each of the array of LEDs.

In some example electric lighting systems, the lighting device may include a controller operable to adjust the brightness of the lighting element.

Some example electric lighting systems may include a plurality of lighting devices. The plurality of lighting devices may include a first lighting device having a first shape. The first lighting device may include a first housing including a first lighting element and a first power device holding portion. The first power device holding portion may include a first universally sized and shaped cavity. The plurality of lighting devices may include a second lighting device having a second shape. The second lighting device may include a second housing including a second lighting element and a second power device holding portion. The second power device holding portion may include a second universally sized and shaped cavity. The electric lighting system may include a universally sized and shaped power device comprising a coupling component. The coupling component may be removably couplable to the first power device holding portion such that a first electrical communication is established when the power device is inserted into the first universally sized and shaped cavity at any rotational position relative to the first lighting device about a first shared central axis. The coupling component may be removably couplable to the second power device holding portion such that a second electrical communication is established when the power device is inserted into the second universally sized and shaped cavity at any rotational position relative to the second lighting device about a second shared central axis.

In some example electric lighting systems, the first power device holding portion may include a first lighting device magnet disposed within the first universally sized and shaped cavity. The second power device holding portion may include a second lighting device magnet disposed within the second universally sized and shaped cavity. The coupling component may include a power device magnet positioned to engage with the first lighting device magnet and the second lighting device magnet.

In some example electric lighting systems, the first lighting device may be a downward projecting illuminator including a first lighting element and a top portion. The first lighting element may be mounted within the top portion. The second lighting device may be an upward projecting illuminator including a second lighting element and a bottom portion. The second lighting element may be mounted within the bottom portion.

In some example electric lighting systems, the power device may provide a base for the first lighting device when the coupling component is removably coupled to the first lighting device such that the first lighting device is operable to stand upright on the power device. The power device may provide a base for the second lighting device when the coupling component is removably coupled to the second lighting device such that the second lighting device is operable to stand upright on the power device.

In some example electric lighting systems, the first lighting device may include a first electrical contact. The second lighting device may include a second electrical contact. The power device may include a third electrical contact. The third electrical contact may be operable to engage the first electrical contact at any rotational position of the power device relative to the first lighting device about a shared central axis of the first lighting device and the power device. The third electrical contact may be operable to engage the second electrical contact at any rotational position of the power device relative to the first lighting device about a shared central axis of the first lighting device and the power device.

In some example electric lighting systems, the electric lighting system may include a charger removably couplable to a bottom portion of the power device. The charger may charge the power device. The charger may provide a base for the power device when the charger is removably coupled to the power device such that the power device is operable to stand upright on the charger.

In some example electric lighting systems, the first lighting element may be operable to receive electrical power from the power device through electrical communication with the power device. The second lighting device may be operable to receive electrical power from the power device through electrical communication with the power device. The power device may include a controller. The controller may be operable to adjust the brightness of the first lighting element and the second lighting element.

In some example electric lighting systems, the first lighting element may include an array of light emitting diodes (LEDs). The controller may be operable to independently adjust the brightness of each of the array of LEDs.

In some example electric lighting systems, the first lighting device may include a first lighting element and a first controller. The first controller may be operable to adjust the brightness of the lighting element.

BRIEF DESCRIPTION OF DRAWING(S)

DETAILED DESCRIPTION

Figure 1:
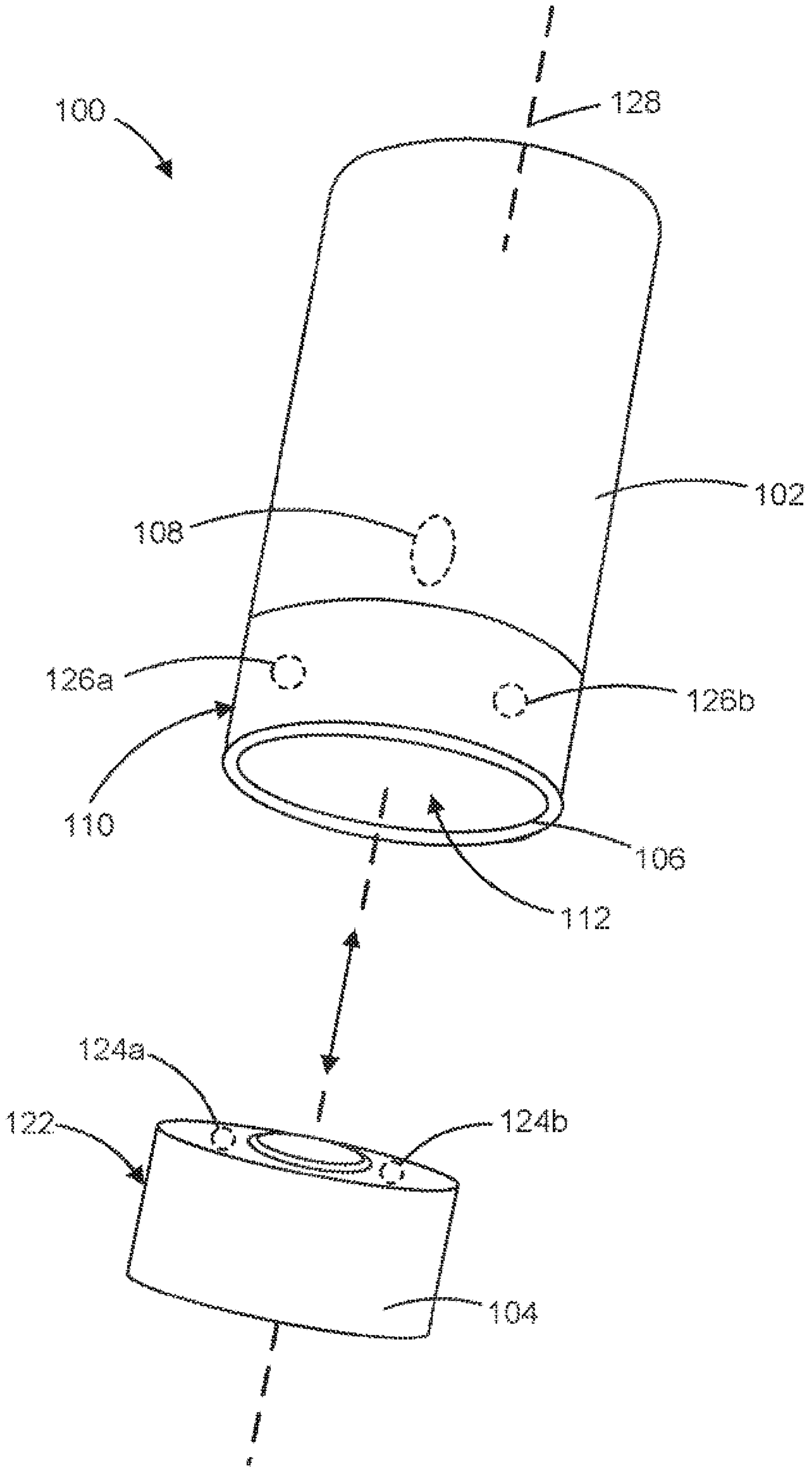
FIG. 1 is an exploded view of an example electric lighting system in accordance with some embodiments.

Users of lighting device may desire to use a lighting device without plugging the lighting device into a wall. For example, a restaurant may desire to place a lighting device on patrons' tables, without laying wires across the floor or the table. Additionally, lighting devices may benefit from the aesthetic of having no wire and practical benefit of not impeding limited space, such as at a restaurant table. Use of such mobile lighting devices may present challenges for powering the lighting devices.

Without receiving power directly from an electrical outlet of a wall, lighting devices may therefore include mobile power devices that retain charge to power the light without the need for plugging in to the wall while the lighting device is turned on. The lighting device will be able to turn on if it receives sufficient power from the power device. Eventually, the power device will transfer enough energy to the lighting device that it becomes depleted and cannot provide enough power to the lighting device. A user may ultimately need to charge a power device such that it may once again power the lighting device. But recharging the power device will require another source of electric power, such as an electrical outlet.

Recharging a power device takes time and effort and can reduce portability. A user may interchange a power device connected to the lighting device, move the lighting device or power device to a location where it may be charged, or otherwise direct power (for example, by extension cord) to the location of the lighting device. The recharging effort is increased when there are numerous lighting devices to be used. An employee of a hotel, for example, may need to recharge hundreds of power devices so that the power devices and lighting devices can be used again for each hotel room. Additionally, a user may want to keep a lighting device in continuous use, such that the lighting device may remain at its intended point of use, such as a restaurant table, lobby space, meeting room, or hotel room.

Some electric lighting systems disclosed herein include the ability to easily and timely connect a power device to a lighting device without having to manually align the power device, connect wires, or unscrew components to insert batteries. Some electric lighting systems also provide utility where the power device is connected in such a manner that the end user experience (such as a restaurant patron) is unimpeded by the sight of a bulky power device. Some electric lighting systems provide the ability to disconnect a depleted removably couplable power device for charging and insert a removably charged power device, so that the lighting device may be continuously used without need for moving or connecting the lighting device itself to a charger. Such continuous use may also decrease expenses for a user who may otherwise have purchased multiple chargeable lighting devices, so that end users (such as hotel guests) could always have a light in use. Some electric lighting systems also provide universal interconnectivity, thereby providing the ability to interchange a power device for one type of lighting device for another lighting device.

FIG. 1 depicts an example electric lighting system 100 in accordance with some embodiments. The electric lighting system 100 includes a lighting device 102 and a power device 104. The power device 104 may include any type of battery, including any type of rechargeable battery. The lighting device 102 includes a housing 106 including a lighting element 108 and a power device holding portion 110. The housing 106 includes structure to retain components such as the lighting element 108 and may be made of any material such as a plastic or metal. In the embodiment illustrated in FIG. 1, the lighting element 108 can be disposed within the housing 106. The power device holding portion 110 is configured to electrically communicate with the power device 104 so that the power device 104 may supply power to the lighting device 102 and ultimately illuminate the lighting element 108. The lighting device 102 includes a cavity 112. The cavity 112 and the power device 104 include electrical contacts sufficient to engage such that an electrical communication is established (as further described in the example shown in FIGS. 2 and 3).

The lighting element 108 can include any one or more of an incandescent bulb, a light-emitting diode (LED), a liquid crystal display (LCD), and any other lighting technology. For example, the lighting element 108 may include an array of LEDs (or other lighting technology). An array includes two or more lights in any arrangement. The lighting element 108 may be configured to mimic flames. For example, one or more LEDs may be varied over time in response to a controller to simulate a flickering or wind effect of a flame. The lighting device 102 could take any suitable three-dimensional shape, such cylinder, or cube, and may include translucent material, semi-translucent material, opaque material, or a combination thereof to create different lighting effects.

One benefit of the electric lighting system 100 is that the power device 104 may be easily decoupled and recoupled to the lighting device 102. When the power device 104 is depleted of power, a user may simply and easily decouple the power device 104 and charge the power device 104 separately from the lighting device 102. Concurrently, a user may couple a second power device to the lighting device 102. And when the second power device is depleted, the user may decouple and charge the second power device and recouple the now charged first power device 104. This ability to removably couple the power device 104 may provide the user with the ability to continuously use a lighting device without the need to ever plug in the lighting device 102 itself.

To aid in decoupling and recoupling, the power device holding portion 110 is configured to hold the power device 104. The power device holding portion 110 may include a cavity 112. The cavity 112 is operable to receive the power device 104 by insertion. The power device 104 may be partially or fully inserted into the cavity 112.

To further aid in decoupling and recoupling, the power device 104 includes a coupling component 122. In the embodiment shown in FIG. 1, the coupling component 122 includes power device magnets **124*a* and 124*b*, each positioned to engage with any of lighting device magnets 126*a* and 126*b* of the power device holding portion 110. The power device magnets 124*a* and 124*b* can be disposed under the surface of the power device 104. The lighting device magnets 126*a* and 126*b* are disposed under a surface within the cavity 112**. These magnets provided are embodiment of an easily couplable system, but other easily coupled components can be used, such as mating grooves and ridges, clamps, keyed prongs, screws, or any other easily removable coupling mechanism.

To further describe advantages of the electric lighting system 100, a shared central axis 128 is depicted in FIG. 1 and serves as a point of reference in a three-dimensional x-y-z coordinate plane. The shared central axis 128 extends in the z-direction in FIG. 1, but the shared central axis could be oriented in any direction. For example, the power device 104 and the lighting device 102 could share a central axis in the x-direction, wherein the lighting device 102 couples to the power device 104 from the side in the x-direction. Rotation about the shared central axis 128 occurs when one or both of the lighting device 102 and the power device 104 turn about the central axis 128 in the x-y plane.

One benefit of an embodiment of the electric lighting system 100 is self-orientation. In the embodiment including power device magnets **124*a* and 124*b*, magnetic force may be sufficient to cause self-orientation at any degree of rotation about the shared central axis 128 of the lighting device 102 and the power device 104. Alternatively, magnetic force may cause self-orientation only at some degrees of rotation about the central shared axis 128. For example, if a user inserts the power device 104 into the lighting device 102 and each of the power device magnets 124*a* and 124*b* are rotationally in-between the lighting device magnets 126*a* through 126*b*, the magnetic force may be too weak to cause rotation. Accordingly, the user may rotate the lighting device 102 with respect to the power device 104 such that the power device magnets 124*a* through 124*b* and lighting device magnets 126*a* and 126*b* are within sufficient proximity to cause magnetic force to further rotate the lighting device 102 and/or magnetically align the lighting device 102** into place.

The self-orientation of the power device 104 may also be referred to as self-orientation of the lighting device 102, as either is being oriented with respect to the other. The self-orienting feature aids in allowing a user to insert the power device 104 into the cavity 112 at any rotational position to establish an electrical connection between the power device 104 and the lighting device 102. Accordingly, in this embodiment the lighting device 102 and power device 104 do not require a particular orientation to be operational. The magnets 124*a*, 124*b*, 126*a*, and 126*b* may rotate the power device 104 or the lighting device 102, or the user may rotate the power device 104 or the lighting device 102, or both, and the magnets 124*a*, 124*b*, 126*a*, and 126*b* orient the power device 104 into an aligned position with the lighting device 102. At such an aligned position, electrical communication can be established and the power device 104 can power the lighting device 102. Therefore, the power device 104 can power the lighting device when inserted into the cavity 112 at any rotational position Self-orientation may allow a user to easily couple and decouple the power device 104 from the lighting device 102. For example, the self-orientation of the electric lighting system 100 allows the user to couple the electric lighting system 100 as follows. The user may first set the power device 104 on a surface. Next, the user simply inserts the power device 104 into the cavity 112 by lowering the lighting device 102 onto the power device 104. One benefit of the self-orientating design is that the user need not worry about the degree of rotation of the lighting device 103 compared to the power device 104. The user may simply rotate the lighting device 103 until the power device magnets 124*a* and 124*b* and the lighting device magnets 126*a* and 126*b* attract. Any one of the power device magnets 124*a* and 124*b* can attract to any one of the lighting device magnets 126*a* and 126*b*. Therefore, the user need not align any one magnet to another and can freely releasably couple the lighting device 102 to the power device 104, saving the user's time and effort and enhancing the user experience. When the user is ready to decouple the lighting device 102 from the power device 104, the user may simply rotate the lighting device 102 to distance the lighting device magnets 126*a* and 126*b* from the power device magnets 124*a* and 124*d*. The user may then lift the lighting device 102 from the power device 104.

The electric lighting system 100 also allows for easy carrying. When the power device 104 is coupled to the lighting device 102, the user may lift the lighting device 102, and the force between the power device holding portion 110 and the coupling component 122 may be sufficient to prevent the power device 104 from decoupling while being transported.

Embodiments of the electric lighting system 100 can have features that aid in establishment of electrical communication with insertion at any rotational position. First, the electric lighting system 100 has the self-orienting feature as described above. Second, the electric lighting system has encircling electrical contacts, as shown in FIG. 2 and FIG. 3.

Figure 2:
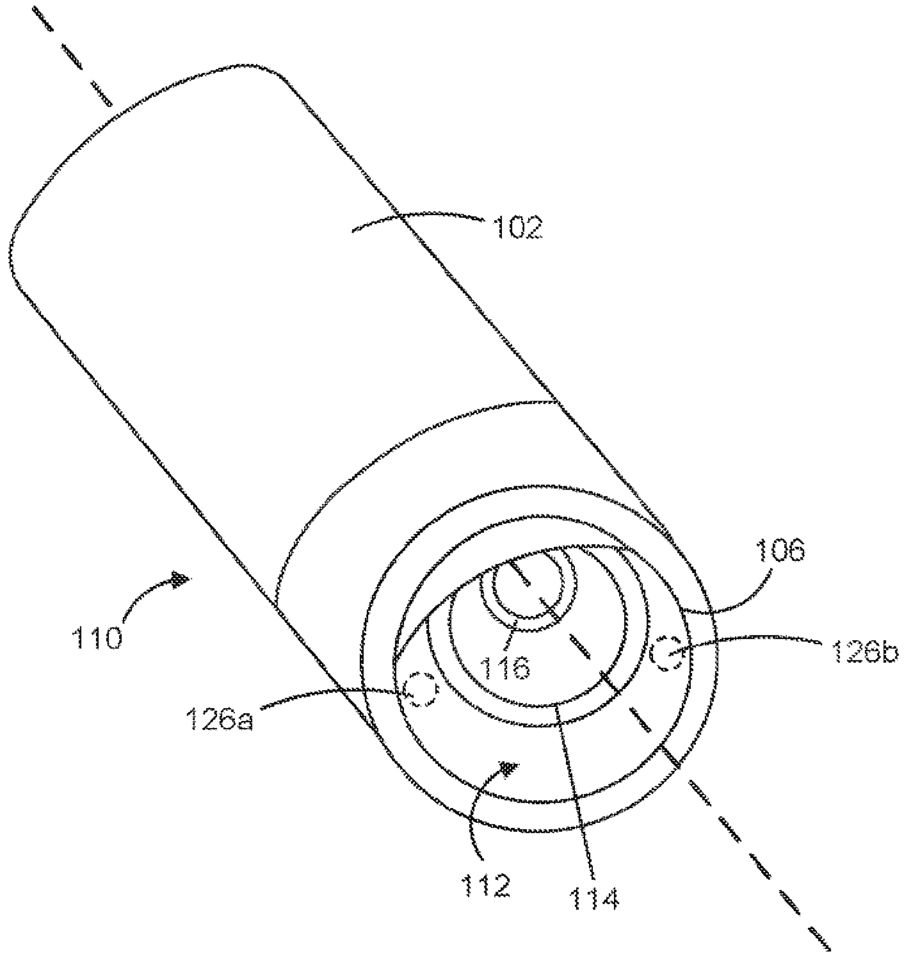
FIG. 2 is a bottom isometric view of an example lighting device in accordance with some embodiments.

FIG. 2 depicts a bottom isometric view of the lighting device 102, showing the power device holding portion 110 of the housing 106. The cavity 112 of the housing 106 includes a first electrical contact 114 disposed within a cavity 112 and a second electrical contact 116 disposed within the cavity 112. The first electrical contact 114 can encircle the second electrical contact 116. This embodiment allows reliable electrical connection independent of orientation.

Figure 3:
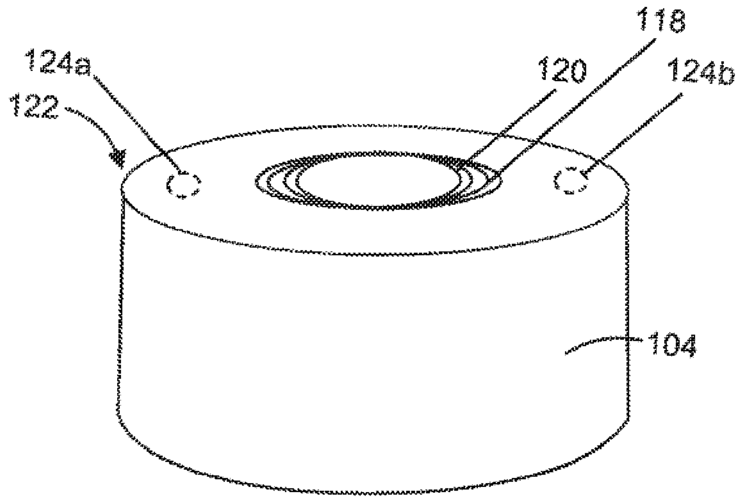
FIG. 3 is a top isometric view of an example power device in accordance with some embodiments.

FIG. 3 depicts a top isometric view of the power device 104, showing the power device holding portion 110, including a third electrical contact 118 and a fourth electrical contact 120. The third electrical contact 118 encircles the fourth electrical contact 120. The first electrical contact 114 and second electrical contact 116 of FIG. 2 are operable to engage with the third electrical contact 118 and fourth electrical contact 120 of FIG. 3. When the first electrical contact 114 engages with the third electrical contact 118 and when the second electrical contact 116 engages with the fourth electrical contact 120 such that electrical current can flow, an electrical communication is established.

In some embodiments, either one of the self-orienting or encircling features may be sufficient to establish electrical communication at any rotational position. For example, if the electric lighting system did not have encircling electrical contacts, the self-orienting feature could be sufficient to align electrical contacts of any other shape or suitable configuration (e.g., points, lines, rectangles, protrusions and holes, grooves and ridges). Without the encircling electric contacts, the user could insert the lighting device 102 into the cavity 112 with electrical contacts of the lighting device 102 misaligned with electrical contacts of the power device 104. Then, during or after insertion of the power device 104 into the lighting device 102, the self-orienting feature causes alignment of the power device magnets 124*a* and 124*b* with the lighting device magnets 126*a* and 126*b* and rotates and/or magnetically connects the power device 104. Such rotating and/or magnetically connection causes alignment of power device electrical contacts 118 and 120 and lighting device electrical contacts 114 and 116. Additionally, the encircling feature (wherein the first electrical contact 114 encircles the second electrical contact 116 and the third electrical contact 118 encircles the fourth electrical contact 120) may be sufficient to establish electrical communication at any rotational position as the first and second electrical contact 114 and 116 can engage the third and fourth electrical contact 118 and 120 at any point due to their circular shape.

Figure 4:
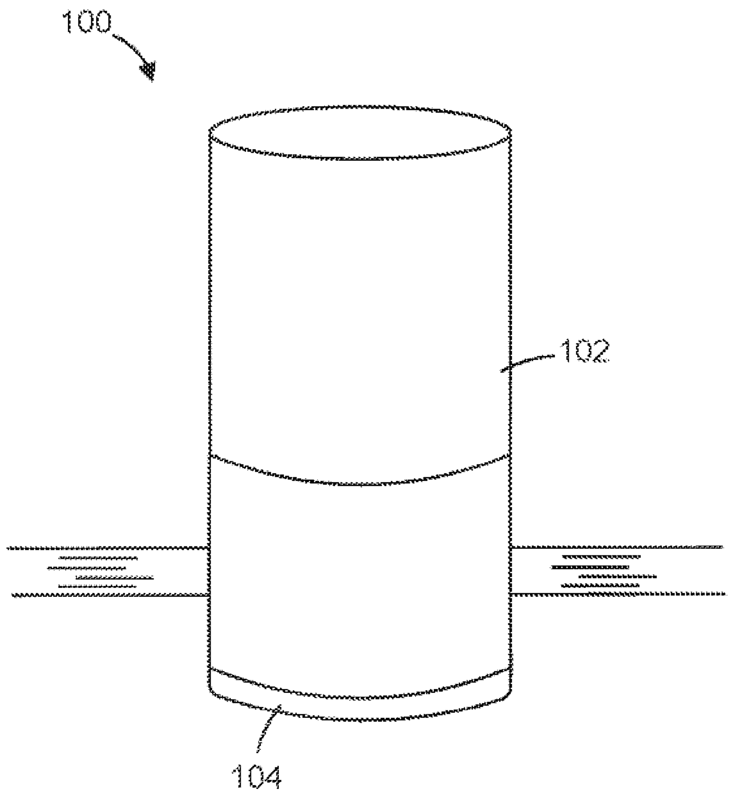
FIG. 4 is an isometric view of an example electric lighting system in a removably coupled state in accordance with some embodiments.

FIG. 4 depicts the example electric lighting system 100 in a releasably coupled state resting on a surface. As shown in FIG. 4, the power device 104 is included in housing 106 that provides a base for the lighting device 102 when the coupling component is removably coupled to the lighting device such that the lighting device 102 is operable to stand upright on housing 106, which includes the power device 104. The power device 104 serving as a base for the lighting device 102 provides ease of coupling, allowing the user to releasably couple the lighting device 102 to the power device 104 while the power device 104 is resting on a surface. Alternative, the electric lighting system 100 could be configured with a power device 104 that stands atop a lighting device 102. The electric lighting system 100 could be configured with a power device that attaches at the side or from any other angle.

Figure 5:
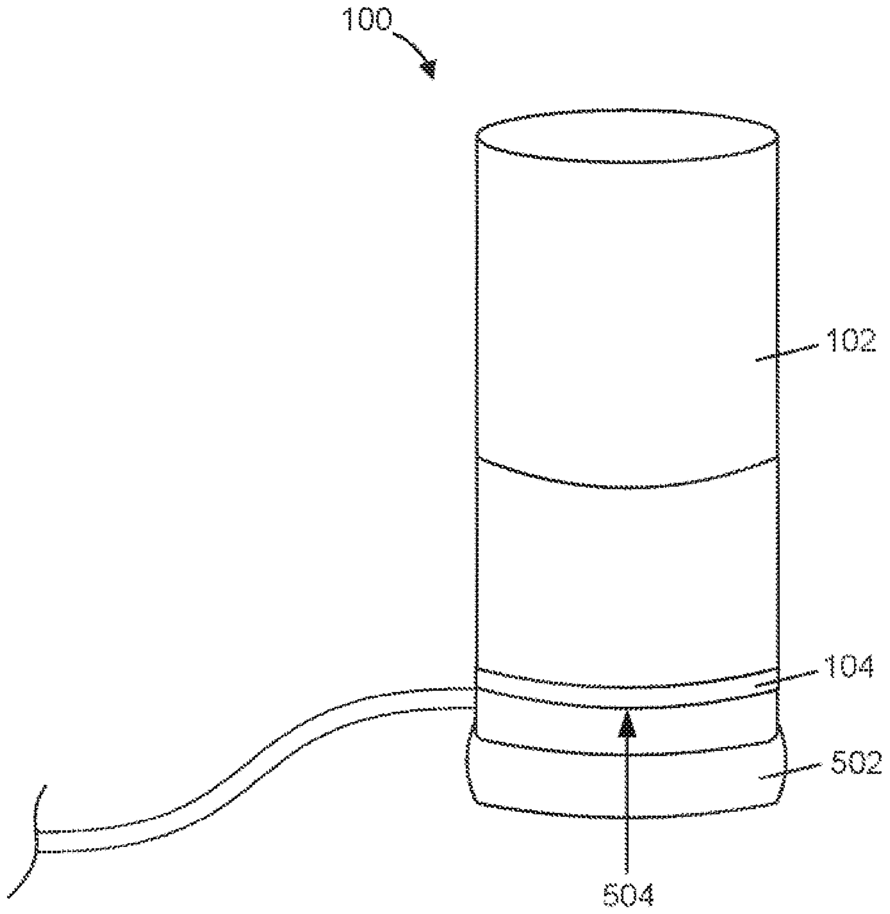
FIG. 5 is an isometric view of an example electric lighting system in a removably coupled state with a charger in accordance with some embodiments.

FIG. 5 depicts the electric lighting system 100 with a charger 502. The charger 502 is removably couplable to a bottom portion 504 of the power device 104. The charger 502 provides a base for the power device 104 when the charger 502 is removably coupled to the power device such that the power device 504 is operable to stand upright on the charger 530. As a base for the power device 104, the charger permits easy connectivity by setting the power device 104 on top of the charger 502.

Figure 6:
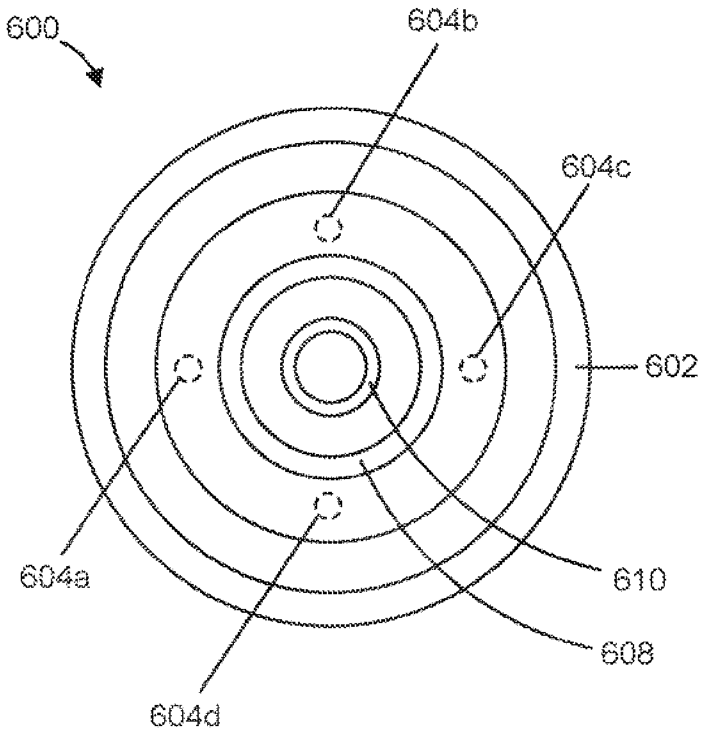
FIG. 6 is a bottom view of an example lighting device in accordance with some embodiments.
Figure 7:
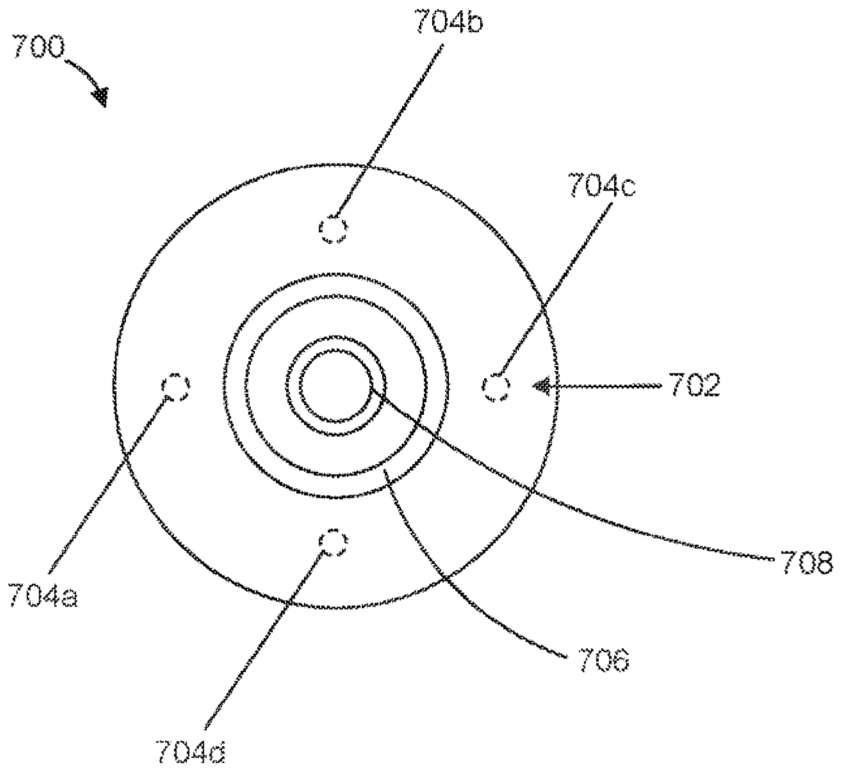
FIG. 7 is a top view of an example power device in accordance with some embodiments.

FIGS. 6 and 7 depict an alternative embodiment of a lighting device 600 and a power device 700 in accordance with some embodiments and provides a view of how the power device 700 may releasably couple to the lighting device 600. In FIG. 6, the lighting device 600 includes a power device holding portion 602. The power device holding portion 602 includes lighting device magnets 604*a* through 604*d* and within a cavity 606. The power device holding portion includes a first electrical contact 608 and a second electrical contact 610 disposed within the cavity 606.

FIG. 7 depicts a power device 700 including a coupling component 702. The coupling component 702 includes power device magnets 704*a* through 704*d* positioned to engage with the plurality of lighting device magnets 604*a* through 604*d* shown in FIG. 6. For example, when a user holds the lighting device 600 in place and inserts the power device 700 into the cavity 606, the magnetic force between the power device magnets 704*a* through 704*d* and the lighting device magnets 604*a* through 604*d* may be sufficient to rotate the power device 700. The power device 700 may be rotated such that each of the power device magnets 704*a* through 704*d* are aligned with the lighting device magnets 604*a* through 604*d*. If the power device 602 is resting in place on a surface and the user inserts the lighting device 600 into the cavity 606 by placing the lighting device 600 over the power device 700 and lowering the lighting device 600, the magnetic force between the power device magnets 704*a* through 704*d* and the lighting device magnets 604*a* through 604*d* respectively, may be sufficient to rotate the lighting device 600. The lighting device 600 may be rotated such that each of the power device magnets 704*a* through 704*d* are aligned with each of the lighting device magnets 604*a* through 604*d*. The power device 700 includes a third electrical contact 706 and a fourth electrical contact 708. This self-orienting feature is sufficient to establish electrical communication between the first electrical contact 608 and the third electrical contact 706 and between the second electrical contact 610 and the fourth electrical contact 708 at any rotational position about a shared central axis.

Numerous variations to the power device holding portion 602 and the coupling component 702 of FIGS. 6 and 7 may be made. For example, the lighting device magnets 604*a* through 604*d* are disposed within the cavity 606 but could be placed on another location of the power device holding portion 602. While shown with magnets 704*a* through 704*d*, the coupling component 702 and the power device holding portion 602 may have different or additional coupling mechanisms, including for example, mating grooves and ridges, screws, or any other coupling mechanism. The coupling component 702 and the power device holding portion 602 may also use any number of magnets, instead of or in addition to those shown. The coupling component 702 may also have more or fewer magnets than the respective number of magnets in the power device holding portion 702.

Figure 8:
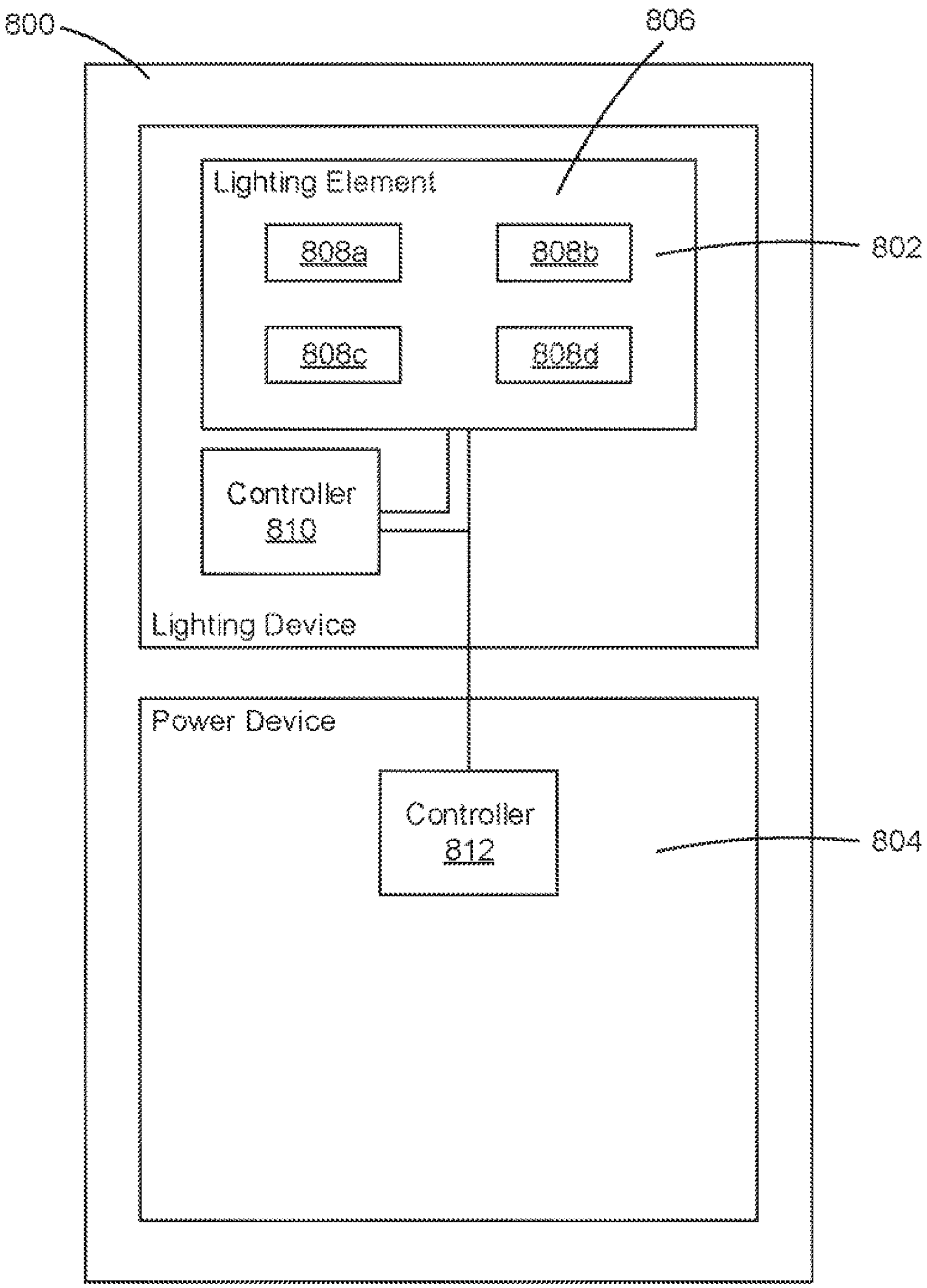
FIG. 8 is a block diagram of an example electric lighting system in accordance with some embodiments.

In some electric lighting systems, the electric lighting system can be configured to provide different lighting effects, such as flame simulation or intensity or brightness of lighting. FIG. 8 is a block diagram of an example electric lighting system 800. The electric lighting system 800 includes a lighting device 802 and a power device 804. The lighting device 802 includes a lighting element 806. The lighting element 806 includes an array of light emitting diodes 808*a* through 808*d*. The lighting element 806 includes a controller 810 that is operable to independently adjust the brightness of each of the array of LEDs 808*a* through 808*d* through electrical communication. For example, the controller 810 can increase the intensity of LED 808*a* while decreasing the intensity of LED 808*b*. The power device 804 includes a controller 812 operable to adjust the brightness of the lighting element 806, including the ability to independently adjust the brightness of each of the array of LEDs 808*a* through 808*d*. The controller 812 is operable to communicate with the controller 810 and both or either may to independently adjust the brightness of each of the array of LEDs 808*a* through 808*d*. Independent adjustment of brightness occurs when one or more LEDs is adjusted while one or more LEDs is adjusted differently or not adjusted. While the electric lighting system has a controller 810 and a controller 812, some electric lighting systems may have only one controller, no controller, or additional controllers.

Another advantage of some electric lighting systems disclosed herein is universal interconnectivity. These systems provide the ability to interchange a power device for one type of lighting device for another lighting device and allowing a user to have multiple types of lighting devices without the need for purchasing a power device for each lighting element.

Figure 9:
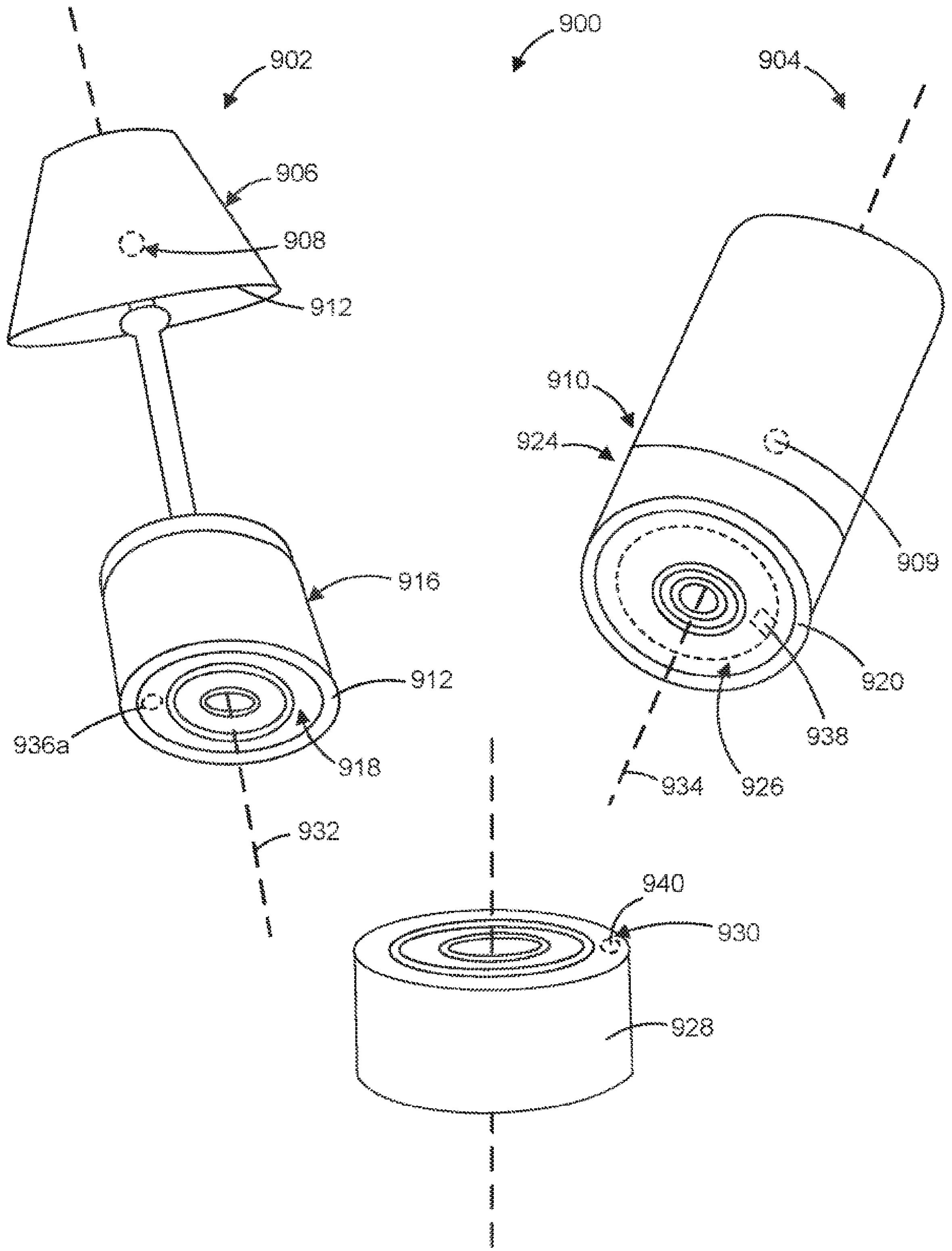
FIG. 9 is an exploded view of an example electric lighting system that includes a plurality of lighting devices in accordance with some embodiments.

FIG. 9 depicts an example electric lighting system 900 that includes a plurality of lighting devices including a first lighting device 902 and a second lighting device 904. The first lighting device 902 has a first shape that is different from a second shape of the second lighting device 904. The first lighting device 902 is a downward projecting illuminator including a top portion 906 and a first lighting element 908. The second lighting device 904 is an upward projecting illuminator including a second lighting element 909 and a bottom portion 910. The second lighting element 909 is mounted within the bottom portion 910.

One advantage of the electric lighting system 900 is that it provides universal connectivity such that the first lighting device 902 and the second lighting device 904 can be interchangeably used and powered by the same source. The first lighting device 902 includes a first housing 912 including the first lighting element 908 and a first power device holding portion 916. The first lighting element 908 is mounted within the top portion 906. The first power device holding portion 916 includes a first universally sized and shaped cavity 918. The second lighting device 904 includes a second housing 920 including the second lighting element 909 and a second power device holding portion 924. The second power device holding portion 924 includes a second universally sized and shaped cavity 926. The electric lighting system 900 includes a universally sized and shaped power device 928 including a coupling component 930. The universal sizing of the cavity 918, the cavity 926, and the power device 928 allows for universal connectivity, such that a user can you the same power device 928 for different lighting devices 902 and 904.

The electric lighting system 900 may also provide advantages described in FIGS. 1-8, such as self-orientation and removable coupling. For example, the coupling component 930 is removably couplable to the first power device holding portion 916 such that a first electrical communication is established when the power device 928 is inserted into the first universally sized and shaped cavity 918 at any rotational position relative to the first lighting device 902 about a first central axis 932. When the power device 928 is aligned with the first central axis 932, the first central axis 932 is shared between the power device 928 and the first lighting device 902. The coupling component 930 is removably couplable to the second power device holding portion 924 such that a second electrical communication is established when the power device 928 is inserted into the second universally sized and shaped cavity 926 at any rotational position relative to the second lighting device 904 about a second central axis 934. When the power device 928 is aligned with the second central axis 934, the second central axis 934 is shared between the power device 928 and the second lighting device 904.

The electric lighting system 900 uses magnetic force to removably couple the power device 928 to the first lighting device 902 and the second lighting device 904. The first power device holding portion 916 includes a first lighting device magnet 936 disposed within the first universally sized and shaped cavity 918. The second power device holding portion 924 includes a second lighting device magnet 938 disposed within the second universally sized and shaped cavity 926. The coupling component 930 includes a power device magnet 940 positioned to engage with the first lighting device magnet 936 and the second lighting device magnet 938. While the electric lighting system 900 uses magnetic force to removably couple, it may use any other coupling mechanism(s) as described above in discussion of other figures.

It may be desirable for the power device 928 provide a base for multiple lighting elements, despite their different shapes. The power device 928 may provide a base for the first lighting device 902 when the coupling component 930 is removably coupled to the first lighting device 902 such that the first lighting device 902 is operable to stand upright on the power device 928. The power device 928 may provide a base for the second lighting device 904 when the coupling component 930 is removably coupled to the second lighting device 904 such that the second lighting device 904 is operable to stand upright on the power device 928. By being able to couple to the downward projecting first lighting device 902 and the downward projecting second lighting device 904, the electric lighting system 100 provides a power device 928 operable to both (1) removably couple to both upward and downward projecting illuminators at any rotational position about a shared central axis and (2) provide a base for both upward and downward projecting illuminators. Being universally sized and shaped, the power device 928 could also couple to differently shaped upward, downward, or other directionally projecting illuminators. Additionally, as described above in reference to earlier example power devices, the power device 928 may have electrical contacts operable to connect to electrical contacts of the first lighting device 902 and to electrical contacts of the second lighting device 904 at any rotational position about a first central axis 932 when shared with the power device 928 and a second central axis 934 when shared with the power device 928, respectively.

The electric lighting system 900 may include a charger as described in reference to earlier figures. The electric lighting system 900 may also power the lighting devices 902 and 904 with the power device 928 as described for other electric lighting systems. The electrical device may include one or more controllers as described in reference to earlier figures. The one or more controllers may be located in one or more of a first lighting device 902, the second lighting device 904, the power device 928, and may be operable to control the first lighting element 908, the second lighting element 909, or both. The first lighting element 908 and the second lighting element 909 may include one or more arrays of light emitting diodes (LEDs). One or more controller(s) may be operable to independently adjust the brightness of each of the array of LEDs.

The above description is illustrative, and the electric systems described herein are not limited to any one embodiment. One or more aspects of any one or more figures may be combined with, substituted, or removed from any other one or more figures. Additionally, other modifications may be made to the systems disclosed herein without departing from the novelty of the disclosure.

What is claimed is:

1. An electric lighting system comprising:

a plurality of lighting devices comprising:

a first lighting device having a first shape, the first lighting device comprising a first housing including a first lighting element and a first power device holding portion, the first power device holding portion comprising a first universally sized and shaped cavity and a first lighting device magnet disposed within the first universally sized and shaped cavity;

a first universally sized and shaped power device comprising a coupling component, wherein:

the first universally sized and shaped power device is operable to be inserted into the first universally sized and shaped cavity of the first lighting device such that only a bottom portion of the first universally sized and shaped power device is visible once it is coupled to the first lighting device; and a charger removably couplable to a bottom portion of the first universally sized and shaped power device, wherein:

the charger charges the first universally sized and shaped power device; and the charger provides a base for the first universally sized and shaped power device when the charger is removably coupled to the first universally sized and shaped power device such that first universally sized and shaped the power device is operable to stand upright on the charger.

2. The electric lighting system of claim 1, wherein:

the first power device comprises a power device controller; and the power device controller is operable to independently adjust the brightness of each of the array of LEDs.

3. The electric lighting system of claim 2, wherein the power device controller can communicate with the lighting device controller to adjust the brightness of light emanating from the lighting element.

4. The electric lighting system of claim 2, wherein power device controller can control the power provided to the first lighting device.

5. The electric lighting system of claim 1, further comprising a second universally sized and shaped power device, wherein upon depletion of the power in the first universally sized and shaped power device, the first universally sized and shaped power device can be uncoupled from the first lighting device and the second universally sized and shaped power device can be coupled to the first lighting device.

6. The electric lighting system of claim 5, wherein the first universally sized and shaped power device can be connected to a charger while the second universally sized and shaped power device can be coupled to the first lighting device.

7. The electric lighting system of claim 1, the coupling component further comprising a power device magnet positioned to engage with the lighting device magnet.

8. The electric lighting system of claim 1, wherein the coupling component is removably couplable to the first universally sized and shaped power device holding portion such that a first electrical communication is established when the first universally sized and shaped power device is inserted into the first universally sized and shaped cavity.

9. The electric lighting system of claim 1, wherein the coupling component further comprises a first power device magnet positioned to engage with the lighting device magnet.

10. The electric lighting system of claim 1, wherein:

the first lighting device comprises a lighting device controller;

the first lighting element comprises an array of light emitting diodes (LEDs); and the lighting device controller is operable to independently adjust the brightness of each of the array of LEDs.

* * * * *